United States Patent

Henze et al.

Patent Number: 5,854,372
Date of Patent: Dec. 29, 1998

[54] PROCESS FOR THE PREPARATION OF HIGH MOLECULAR WEIGHT POLYCONDENSATES

[75] Inventors: Andree Henze, Hofheim; Karsten Blatter, Eppstein, both of Germany

[73] Assignee: Hoechst Aktiengesellschaft, Frankfurt, Germany

[21] Appl. No.: 539,784

[22] Filed: Oct. 5, 1995

[30] Foreign Application Priority Data

Oct. 7, 1994 [DE] Germany ............ 44 35 874.1

[51] Int. Cl.$^6$ .......... C08G 69/28; C08G 63/78; C08G 85/00; C08G 69/48

[52] U.S. Cl. .......... 528/176; 528/179; 528/182; 528/188; 528/480; 528/502 R; 528/503; 525/420

[58] Field of Search .......... 528/480, 502 R, 528/503, 176, 179, 182, 188; 525/420

[56] References Cited

U.S. PATENT DOCUMENTS

| | | |
|---|---|---|
| 3,925,295 | 12/1975 | Osborn et al. . |
| 4,102,846 | 7/1978 | Bentley et al. ............ 260/31.2 N |
| 5,140,098 | 8/1992 | Pipper et al. ............ 528/483 |

FOREIGN PATENT DOCUMENTS

| | | |
|---|---|---|
| 0 275 163 | 7/1988 | European Pat. Off. . |
| 0 275 164 | 7/1988 | European Pat. Off. . |
| 0275163 | 7/1988 | European Pat. Off. . |
| 0276915 | 8/1988 | European Pat. Off. . |
| 0 306 165 | 3/1989 | European Pat. Off. . |
| 0306165 | 3/1989 | European Pat. Off. . |
| 0366479 | 5/1990 | European Pat. Off. . |

*Primary Examiner*—P. Hampton-Hightower
*Attorney, Agent, or Firm*—Frommer Lawrence & Haug LLP

[57] ABSTRACT

To prepare nitrogen-containing polycondensates, a starting substance which still contains reactive end groups is dispersed in a high-boiling inert solvent, preferably in the presence of a dispersing auxiliary, low molecular weight by-products are distilled off at elevated temperature, the batch is cooled and the dispersed polycondensate is isolated. To prepare the starting substance, a mixture of at least two monomers which react with one another is heated up to a constant reaction temperature, a melt being formed at least in part, but initially no homogeneous melt occurring. The reaction is continued until a homogeneous melt is present. The precondensate formed is then dispersed in the high-boiling inert solvent and the condensation reaction is brought to completion.

12 Claims, No Drawings

PROCESS FOR THE PREPARATION OF HIGH MOLECULAR WEIGHT POLYCONDENSATES

CROSS-REFERENCE TO RELATED APPLICATION

This application claims priority to German Application No. P 44 35 874.1, filed Oct. 5, 1995, incorporated herein by reference.

BACKGROUND OF THE INVENTION

1. Field of the Invention

The present invention relates to a process for the preparation of aliphatic or aromatic polycondensates in a high-boiling inert solvent. The invention particularly relates to a process for the preparation of aromatic polyamides, polyamide-imides, polyimides and polybenzimidazoles.

2. Description of the Related Art

Processes for the preparation of polycondensates by means of high temperature dispersion condensation have been known for a relatively long time. According to EP 306 165, high molecular weight dispersions of polyamides in a high-boiling hydrocarbon are prepared by polycondensation of nylon salts in the presence of a hypophosphite catalyst. The nylon salts are prepared by reaction of aliphatic, alicyclic or aromatic dicarboxylic acids with aliphatic, alicyclic or aromatic diamines. Neither the nylon salt employed nor the polyamide produced should melt under the reaction conditions.

According to EP 275163, for the preparation of polycondensates, a polymerizable material, for example a monomer or an oligomer, is dispersed in an inert high-boiling organic liquid medium in the presence of a finely divided inorganic powder and a copolymer with reactive groups, which acts as a dispersing auxiliary. The reaction is carried out at high temperatures. The polycondensate formed should be insoluble in the liquid medium, and at the end of the reaction is likewise present in the finely divided state. The preparation of aromatic or aliphatic or aliphatic-aromatic polyesters which were partly in the molten state at the reaction temperature is described. Nitrogen-containing polymers are not mentioned.

In the case of dispersion condensation, the monomers employed are not miscible with the dispersing medium. However, they can form emulsions or dispersions having particle sizes below 100 $\mu$m. The polymer formed is also insoluble in this medium and is present in a finely divided state with particle sizes of less than 100 $\mu$m at the end. The reaction temperatures are above 200° C.

This polycondensation process in dispersion meets with difficulties if monomers or monomer mixtures which do not form a homogeneous melt in the initial stage of the reaction are employed. These monomer mixtures are indeed often dispersible and can be finely distributed in the high-boiling dispersing medium; however, an inhomogeneous distribution of the monomers exists in the individual dispersed particles of the solid batch. This leads to a wide molecular weight distribution and a low molecular weight. The polycondensation cannot be conducted to give polycondensates with industrially interesting molecular weights of above 10,000 g/mol.

OBJECT OF THE INVENTION

The object was therefore to prepare polymers, in particular aromatic nitrogen-containing polymers, which have a particularly high molecular weight and/or a very narrow molecular weight distribution. The present process achieves this object.

SUMMARY OF THE INVENTION

A process for the preparation of polycondensates has now been found, in which a starting substance which still contains reactive end groups is dispersed in a high-boiling inert solvent, low molecular weight by-products are distilled off at elevated temperature, the batch is cooled and the dispersed polycondensate is isolated. This process comprises heating up a mixture of at least two monomers which react with one another to a constant reaction temperature, a melt being formed at least in part, but initially no homogeneous melt occurring, continuing the reaction until a homogeneous melt is present, then dispersing the precondensate formed in the high-boiling inert solvent and bringing the condensation reaction to completion.

The point at which a homogeneous monomer/oligomer mixture is present for the first time depends on the nature of the monomers or monomer mixtures used and can correspond to a conversion of 10 to 95%. Preferably, the reaction in the homogeneous melt will be interrupted at the latest when 90% of the volatile by-products which can be split off have been distilled off. The melt condensation can be carried out here in the same apparatus as the subsequent dispersion polycondensation. However, the two steps are advantageously carried out in separate apparatuses which are appropriate for the different requirements of the processes (heat transfer, stirrer and, for example, removal of relatively large amounts of by-products by distillation in the 1st step). It is also possible for the melt obtained in the first stage of the process to be cooled, to be allowed to solidify, to be comminuted and then to be employed for the dispersion polycondensation.

DETAILED DESCRIPTION OF THE INVENTION

The invention is based on the observation that many inhomogeneous monomer mixtures are converted into a homogeneous oligomer melt in a melt reaction as the conversion progresses. However, typically for a polycondensation, this oligomer melt has a low melt viscosity, even at high conversions of up to 95%, and a low degree of polymerization of less than 20, although only little free monomer is still present. The low viscosity of such oligomer melts allows easy, homogeneous dispersion in the high-boiling dispersing medium in which the polycondensation can then be brought to completion to give conversions of virtually 100%, but significantly higher than 95%. This second reaction step is possible only very incompletely in a melt reaction because the viscosity of the polymer melt rises very sharply at conversions>95% or the melt even solidifies.

Splitting the reaction into two process steps is thus a very advantageous combination of melt condensation and dispersion condensation which opens up access to high molecular weight polycondensates which are not accessible when the two processes are used separately.

The process according to the invention is particularly valuable for the preparation of aromatic polyamides, polyamide-imides, polyimides and polybenzimidazoles, because in this one of the monomers employed is often an aromatic dicarboxylic acid having a high melting point, in particular above 250° C., and a low solubility in the reaction melt.

Examples are dicarboxylic acids of the general structure HOOC—R—COOH, in which

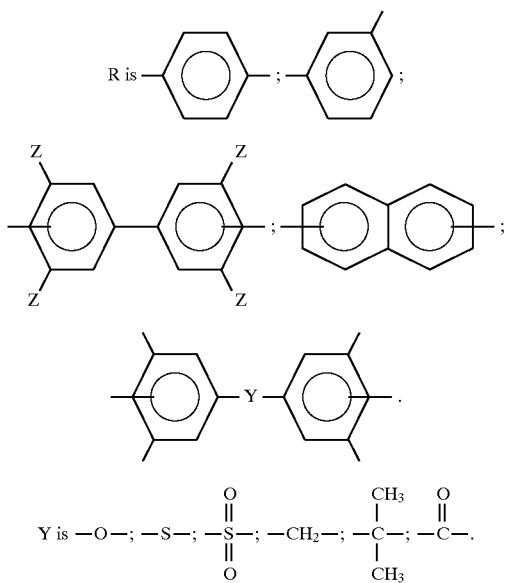

and Z is F, Cl, Br, CH$_3$ or H.

This applies in particular to terephthalic acid, isophthalic acid and the diphenyl ether-dicarboxylic acids, biphenyldicarboxylic acids and naphthalenedicarboxylic acids.

Up to 10 mol % (based on the amounts of acids employed) of a monofunctional substance can be added to the batch, i.e. the equivalence of the groups can be deviated from, for the purpose of limiting the molecular weight.

High-boiling inert solvents which are employed are, in particular, high-boiling hydrocarbon mixtures. However, any other inert reaction medium which has a sufficiently high melting point, does not dissolve the polymer synthesized and does not undergo side reactions with the monomer or the polymer can also be used.

Those solvents which form an azeotrope with the low molecular weight by-product formed in the polycondensation and thereby remove this very effectively from the reaction system by distillation are particularly preferred.

Examples of such inert solvents are:
a) hydrogenated terphenyls, tradename ®"Santotherm" (Monsanto)
b) phenyl ether mixtures under the tradename ®"Marlotherm" (Hüls AG)
c) any high-boiling hydrocarbon mixture, for example "Therminol E" (Shell AG)
d) mixtures of oligomeric fluorine compounds, for example ®"Hostinert" from Hoechst AG and mixtures of these solvents with one another.

A dispersing auxiliary is advantageously added to keep the dispersion in the high-boiling solvent stable.

The dispersing auxiliaries added should prevent aggregates of the monomer particles and of the polymer particles greater than 100 μm from forming, over the entire temperature range of the reaction. In general, 1–50% by weight (based on the dispersing medium) of dispersing auxiliary will be added to the batch in order to achieve stable dispersions. Amounts of 1–10% by weight, and in particular 2–4% by weight, are preferred. The dispersing auxiliaries should have no functional groups which react with the monomers and thereby impair the polycondensation. A shift in the equivalence of the functional groups by the dispersing auxiliary, which would lead to a depression of the maximum degree of polycondensation which can be achieved, is particularly undesirable. The dispersing auxiliaries must of course be sufficiently stable to heat under the conditions of the polycondensation, since degradation products could lead to a deterioration in the property of the polycondensates and the stabilizing action is reduced.

The stabilizing action of the dispersing auxiliaries can be based on the fact that—depending on their structure—the viscosity of the inert solvent is increased in the range of the polycondensation reaction (example: ®Bentone 38 from Rheox Inc.). The stabilizing action can also be based on the fact that the dispersing auxiliaries have an amphiphilic character, i.e. some functional groups of the dispersing auxiliary have a high affinity for the inert (usually non-polar) solvent, and other functional groups in turn have a high affinity for the polycondensate. This leads to a concentration of the dispersing auxiliaries between the polycondensate and inert solvent.

Examples of such substances are block copolymers and polymers, in particular of polar and non-polar monomers, for example the copolymers obtainable under the tradename ®"Surlyn" from DuPont. However, this group also includes low molecular weight amphiphilic compounds, such as, for example, surfactants. For example, pyrrolidones with long-chain N-alkyl groups, for example with $C_6$–$C_{26}$-alkyl groups, in particular with $C_9$–$C_{22}$-alkyl groups, on the one hand have a high affinity for the non-polar inert solvent and a high affinity for the monomer or polymer. The stabilizing action of the dispersing auxiliaries can furthermore be based on the fact that they change the surface tension of the dispersed monomer and polymer particles.

The use of hydrophobically treated clay minerals, such as Bentone 38, for the preparation of aliphatic polyamides and liquid-crystalline aromatic polyesters is known from EP 0 275 163.

It is also possible to employ several dispersing auxiliaries at the same time, one component of which, for example, stabilizes the dispersion of the monomers, while the other component has a stabilizing action on the polymer dispersion.

N-Alkylpyrrolidones have the advantage that dispersing auxiliaries can easily be removed from the polycondensate in vacuo.

The process according to the invention is preferably suitable for the preparation of aromatic polyamides. In this reaction, equimolar amounts of at least one dicarboxylic acid and at least one aromatic diamine or an acyl derivative thereof are first subjected to a condensation reaction under the influence of heat until a homogeneous melt is present, and the precondensate formed is then dispersed in the high-boiling inert solvent. After the condensation reaction has been brought to completion, the dispersed polyamide is isolated.

If the dicarboxylic acid employed in the preparation of the aromatic polyamide has a high melting point, a reaction temperature which is lower than the melting point of the dicarboxylic acid can be chosen. The dicarboxylic acid should not be completely soluble in the melt of the monomers initially present. If this melt should form immediately, for example in the case of the reaction of dimethyl terephthalate with ethylene glycol, the present two-stage process can indeed be used, but is not necessary.

A reaction temperature which is higher than the melting point of the dicarboxylic acid can also be chosen if the molten dicarboxylic acid is not completely miscible in the melt of the other monomers.

The invention is illustrated in more detail by the Examples.

EXAMPLES

Example 1 a) Preparation of a Precondensate by Melt Condensation 2 mol (840 g) of 2,2-bis(4-(4-aminophenoxy)phenyl) propane are melted (140° C.) in a three-necked glass flask with a dropping funnel, vacuum/nitrogen connection and stirrer and are acetylated by dropwise addition of 4 mol of acetic anhydride. The dropping funnel is removed and replaced by a distillation bridge. 1.6 mol (265.8 g) of terephthalic acid and 0.4 mol (66.45 g) of isophthalic acid are added and the acetic acid formed during the acetylation is distilled off at 180° C. The temperature is increased to 260° C. and the polycondensation is conducted up to a conversion of 85%, which corresponds to removal of 85% of the theoretical amount of acetic acid by distillation. At this point (about 1 hour), the acids are distributed homogeneously in the melt (yellow, still low-viscosity oligomers). The comminuted product (I) is employed as monomer in the following condensation.

b) Nonaqueous Dispersion Polycondensation of the Precondensate 233 g of product (I) are melted at 240° C. in a 2 liter three-necked flask with a nitrogen inlet, stirrer, internal thermometer and adjustable bath heating. The dispersing medium is prepared separately by mixing 400 g of Santotherm with 18.6 g of Bentone 38 (4%, based on the total amount of Santotherm) in a disperser. After 10 minutes, 6.15 g (5.16 ml) of propylene carbonate (33%, based on Bentone 38) are added. This mixture is slowly added to the hot melt of the precondensate, which has a temperature of 240° C. The mixer is rinsed with 66 g of Santotherm and these are likewise added to the reaction batch.

The temperature is increased slowly, while stirring as intensively as possible, and is finally 280° C. The total reaction time is 8 hours. When the condensation reaction has ended, the mixture is cooled, while stirring (at least until consolidation of the dispersed particles has occurred) and the reaction batch is filtered, washed with toluene in the mixer and dried. An aromatic polyamide having a Staudinger index (intrinsic viscosity) of 1.02 dl/g and an $M_w/M_n$ ratio of 2.1 is obtained. This powder can be compression molded to a flexible, mechanically stable sheet at 320° C.

The two reaction stages a) and b) can also be carried out here in the same apparatus, without isolation of the precondensate.

Example 2

(Comparison Experiment Without Precondensation of the Monomer Mixture)

71.84 g of 2,2-bis(4-(4-aminophenoxy)phenyl)propane (0.175 mol) are placed under a nitrogen atmosphere in a 2 l three-necked flask with a nitrogen inlet, stirrer, internal thermometer and dropping funnel by evacuation and repressurizing with nitrogen several times. The contents of the flask are melted and are acetylated at about 140° C. by dropwise addition of 0.35 mol (34.2 ml) of acetic anhydride.

A distillation bridge is attached and the acetic acid formed is then distilled off. The flask now contains a total of 86.55 g of acetylated compounds.

23.25 g of terephthalic acid (0.14 mol) and 5.815 g (0.035 mol) of isophthalic acid are now added (total amount of monomers=115.6 g). During the distillation, 400 g of Santotherm are mixed with 18.6 g of Bentone 38 (4%, based on the total amount of Santotherm) with a disperser. After 10 minutes, 6.15 g (5.16 ml) of propylene carbonate (33%, based on Bentone 38) are added. The propylene carbonate improves the shearing action on the Bentone 38. This leads to an increase in the viscosity of the Santotherm/Bentone 38 mixture.

This mixture is slowly added to the hot monomers, which have a temperature of 230° C. The mixer is rinsed with 66 g of Santotherm and these are likewise added to the reaction batch. The temperature is increased to finally 280° C., while stirring as intensively as possible. The total reaction time is 8 hours.

When the condensation reaction has ended, the mixture is cooled, while stirring, until consolidation of the dispersed particles has occurred. The reaction batch is then filtered, washed with toluene (in the mixer) and dried.

A pale beige powder having an intrinsic viscosity of 0.7 dl/g (in NMP at 25° C.) and an $M_w/M_n$ ratio of 2.53 is obtained. Hot compression molding of this powder gives a mechanically unstable, brittle test specimen.

Example 3

(Use of N-dodecylpyrrolidone as the Dispersing Auxiliary)

287.4 g (=0.7 mol) of 2,2-bis(4-(4-aminophenoxy) phenyl)-propane (=BAB) are acetylated with 1.45 mol (136.8 ml) of acetic anhydride as in Example 1, and 93 g of terephthalic acid (0.56 mol) and 23.26 g of isophthalic acid (0.14 mol) are added. The batch is subjected to "initial condensation", with gentle stirring, until the acids have dissolved homogeneously in the melt analogously to Example 1. 800 g of Santotherm and 40 ml of N-dodecylpyrrolidone are added to the resulting homogeneous melt at 240° C. The precondensate is dispersed by intensive stirring and polycondensation is carried out at 270° C. for 8 hours. The polyamide is isolated by filtration, washed with toluene and acetone and dried at 180° C. in vacuo. The intrinsic viscosity is 1.1 dl/g in NMP and the powder can be compression molded to a clear, very tough sheet at 320° C.

Example 4

The Bentone 38 employed as the dispersing auxiliary in Example 1 can be removed almost completely from the polymer powder if the working up of the reaction batch is varied as follows:

Toward the end of the reaction, the polyamide dispersion is cooled to room temperature. It is diluted with twice the amount of toluene and stirred for half an hour, and the mixture is left to sediment. After about 10 minutes, the polyamide powder has sedimented and the supernatant, very fine Bentone 38 dispersion can be decanted. Suspension with toluene is carried out again, and the sedimentation and decanting are repeated. A polyamide powder purified in this manner virtually no longer contains Bentone 38.

Silicon, the main element of Bentone 38, can no longer be detected by X-ray fluorescence analysis.

We claim:

1. A process for the preparation of a polycondensate in which a starting substance which still contains reactive end groups is dispersed in a high-boiling inert solvent, with the proviso that the high-boiling inert solvent is not a silicone oil, low molecular weight by-products are distilled off at elevated temperature, the batch is cooled and the dispersed polycondensate is isolated, which comprises heating up a mixture of at least two monomers which react with one another to a constant reaction temperature, a melt being formed at least in part, but initially no homogeneous melt occurring, continuing the reaction until a homogeneous melt is present, then dispersing the precondensate formed in the high-boiling inert solvent and bringing the condensation reaction to completion.

2. A process for the preparation of a polycondensate in which a starting substance which still contains reactive end groups, is dispersed in a high-boiling inert solvent, with the proviso that the high-boiling inert solvent is not a silicone oil, low molecular weight by-products are distilled off at elevated temperature, the batch is cooled and the dispersed polycondensate is isolated, which comprises heating up a mixture of at least two monomers which react with one another to a constant reaction temperature, a melt being formed at least in part, but initially no homogeneous melt occurring, continuing the reaction until a homogeneous melt is present, then dispersing the precondensate formed in the high-boiling inert solvent and bringing the condensation reaction to completion, wherein the precondensate formed is allowed to solidify on cooling, is comminuted and is then dispersed in the high-boiling inert solvent and the condensation reaction is brought to completion.

3. A process for the preparation of a polycondensate comprising using a starting substance which contains reactive end groups, dispersing the starting substance in a high-boiling inert solvent, with the proviso that the high-boiling inert solvent is not a silicone oil, distilling off a low molecular weight by-product at elevated temperature, cooling the batch and isolating the dispersed polycondensate, which comprises heating up a mixture of at least two monomers which react with one another to a constant reaction temperature, a melt being formed at least in part, but initially no homogeneous melt occurring, continuing the reaction until a homogeneous melt is present, then dispersing the precondensate formed in the high-boiling inert solvent and bringing the condensation reaction to completion, wherein the homogeneous melt is cooled at the latest when 90% of the volatile by-products which can be split off have been distilled off.

4. A process for the preparation of a polycondensate comprising using a starting substance which contains reactive end groups, dispersing the starting substance in a high-boiling inert solvent, with the proviso that the high-boiling inert solvent is not a silicone oil, distilling off a low molecular weight by-product at elevated temperature, cooling the batch and isolating the dispersed polycondensate, which comprises heating up a mixture of at least two monomers which react with one another to a constant reaction temperature, a melt being formed at least in part, but initially no homogeneous melt occurring, continuing the reaction until a homogeneous melt is present, then dispersing the precondensate formed in the high-boiling inert solvent and bringing the condensation reaction to completion, wherein the reaction in the high-boiling inert solvent is carried out in the presence of a dispersing auxiliary with the proviso that the dispersing auxiliary is not a polyorganosiloxane.

5. A process for the preparation of a polycondensate comprising using a starting substance which contains reactive end groups, dispersing the starting substance in a high-boiling inert solvent, with the proviso that the high-boiling inert solvent is not a silicone oil, in the presence of a dispersing auxiliary, distilling off a low molecular weight by-product at elevated temperature, cooling the batch and isolating the dispersed polycondensate, which comprises heating up a mixture of at least two monomers which react with one another to a constant reaction temperature, a melt being formed at least in part, but initially no homogeneous melt occurring, continuing the reaction until a homogeneous melt is present, then dispersing the precondensate formed in the high-boiling inert solvent and bringing the condensation reaction to completion, wherein the dispersing auxiliary is a surface-active laminar silicate.

6. The process as claimed in claim 5, wherein the surface-active laminar silicate is removed from the dispersion in the high-boiling inert solvent by fractional sedimentation.

7. A process for the preparation of a polycondensate in which a starting substance which still contains reactive end groups is dispersed in a high-boiling inert solvent, with the proviso that the high-boilinq inert solvent is not a silicone oil, low molecular weight by-products are distilled off at elevated temperature, the batch is cooled and the dispersed polycondensate is isolated, which comprises heating up a mixture of at least two monomers which react with one another to a constant reaction temperature, a melt being formed at least in part, but initially no homogeneous melt occurring, continuing the reaction until a homogeneous melt is present, then dispersing the precondensate formed in the high-boiling inert solvent and bringing the condensation reaction to completion, wherein the reaction in the high-boiling inert solvent is carried out in the presence of a dispersing auxiliary and an N-alkylpyrrolidone is employed as the dispersing auxiliary.

8. The process as claimed in claim 7, wherein the dispersing auxiliary is removed from the isolated polycondensate by drying in vacuo.

9. A process for the preparation of a polycondensate in which a starting substance which still contains reactive end groups is dispersed in a high-boiling inert solvent, with the proviso that the high-boiling inert solvent is not a silicone oil, low molecular weight by-products are distilled off at elevated temperature, the batch is cooled and the dispersed polycondensate is isolated, which comprises heating up a mixture of at least two monomers which react with one another to a constant reaction temperature, a melt being formed at least in part, but initially no homogeneous melt occurring, continuing the reaction until a homogeneous melt is present, then dispersing the precondensate formed in the high-boiling inert solvent and bringing the condensation reaction to completion, wherein equimolar amounts of at least one aromatic dicarboxylic acid and at least one aromatic diamine or an acyl derivative thereof are first subjected to a condensation reaction under the influence of heat and without a solvent, until a homogeneous melt is present, the precondensate formed is dispersed in the high-boiling inert solvent, the condensation reaction is brought to completion and the dispersed polyamide is then isolated.

10. The process as claimed in claim 9, wherein a reaction temperature which is lower than the melting point of the dicarboxylic acid is chosen and the dicarboxylic acid is not completely soluble in the melt of the other monomers.

11. The process as claimed in claim 9, wherein a reaction temperature which is higher than the melting point of the dicarboxylic acid is chosen and the molten dicarboxylic acid is not completely miscible in the melt of the other monomers.

12. A process for the preparation of a polycondensate in which a starting substance which still contains reactive end groups is dispersed in a high-boiling inert solvent, with the proviso that the high-boiling inert solvent is not a silicone oil, low molecular weight by-products are distilled off at elevated temperature, the batch is cooled and the dispersed polycondensate is isolated, which comprises heating up a mixture of at least two monomers which react with one another to a constant reaction temperature, a melt being formed at least in part, but initially no homogeneous melt occurring, continuing the reaction until a homogeneous melt is present, then dispersing the precondensate formed in the high-boiling inert solvent and bringing the condensation reaction to completion, wherein the aromatic dicarboxylic acid employed is chosen from the group consisting of terephthalic acid, isophthalic acid, diphenyl ether-dicarboxylic acids, biphenyldicarboxylic acids and 1,4-or 2,6-naphthalenedicarboxylic acid.

* * * * *